3,813,234
ORTHO-TOLUIDINE PLANT REGULANTS
Robert K. Howe, Bridgeton, Mo., assignor to Monsanto Company, St. Louis, Mo.
No Drawing. Filed Dec. 30, 1971, Ser. No. 214,463
Int. Cl. A01n 9/20
U.S. Cl. 71—76      9 Claims

ABSTRACT OF THE DISCLOSURE
Effective plant regulation is obtained by the application of a class of o-toluidines to plants.

---

This invention relates to methods of regulating the growth of plants and to compositions which are effective plant growth regulants. More particularly, this invention relates to the use of ortho-toluidines for regulating the growth of plants and as the essential active ingredient in compositions useful to regulate plant growth.

The o-toluidines useful in accordance with this invention are characterized by the presence of a halo substituent at the 4 position of the aniline ring. The aniline ring can be further substituted at the 5 position. This class of o-toluidines is represented by the formula

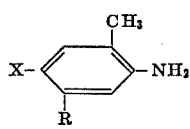

wherein X is halogen, i.e. fluorine, chlorine, bromine or iodine and R is selected from the group consisting of hydrogen, methyl and preferably halogen. A particularly preferred class of compounds are those wherein halogen is chlorine or bromine.

Representative o-toluidines of the above formula useful as plant regulants in accordance with this invention include I   4-chloro-o-toluidine
II   4-fluoro-o-toluidine
III   4-bromo-o-toluidine
IV   4-bromo-5-methyl-o-toluidine
V   4-bromo-5-chloro-o-toluidine
VI   4-bromo-5-fluoro-o-toluidine
VII   4-iodo-5-chloro-o-toluidine
VIII   4,5-dichloro-o-toluidine The term "plant regulant," as employed in this application, connotes a material which serves to modify the normal sequential development of a treated plant to agricultural maturity. Such modification may result from the effect of the material on the physiological processes of the plant or from the effect of said material on the morphology of the plant. It should additionally be recognized that modifications may also result from a combination or sequence of both physiological and morphological factors.

Modifying effects of a plant regulant are probably most readily observed as changes in the size, shape, color or texture of the treated plant or any of its parts. Similarly, changes in the quantity of the plant fruit or flowers are also quite apparent from simple, visual inspection. The above changes may be characterized as an acceleration or retardation of plant growth, stature reduction, leaf or canopy alteration, increased branching, tillering, terminal inhibition, increased flowering or fruit set, increased root growth, stool or sprout inhibition, delayed budding, defoliation, desiccation, delayed senescence, prolonged dormancy, increased cold hardiness, delayed or accelerated ripening, thinning of fruit, prevention of pre-harvest fruit drop, loosening of fruit and the like.

Modifications in the normal sequential development of a treated plant to agricultural maturity may also be manifested by reduced transpiration or increased carbohydrate deposition or protein content.

Although many of the above modifications are per se desirable, it is most often the ultimate effect of such modifications on the economic factor that is of primary significance. For example, reducing the physical size of each plant in a field permits the growing of more plants per unit area and leads to more efficient use of crop land. Many plants of reduced stature are more tolerant of drought and cold temperatures and are more resistant to pest infestations and to lodging. Further, a reduction in the maturation rate on portions of a crop permits an extended harvest period at peak yield and more efficient use of subsequent crop processing equipment.

It is to be understood that the regulation of plants in accordance with the instant invention does not include the total inhibition or the killing of such plants. Although phytotoxic amounts of the materials disclosed herein might be employed to exert a herbicidal (killing) action, it is contemplated here to employ only plant regulating amounts of such materials in order to modify the normal sequential development of the treated plant to agricultural maturity. The application of a plant regulating amount may be applied to plants in sequence at various stages of the plants' development to obtain various desirable responses. As may be expected, and as is apparent to those skilled in the art, such plant regulating amounts will vary, not only with the material selected, but also with the modifying effect desired, the species of plant and its stage of development, the plant growth medium and whether a permanent or transitory effect is sought.

In accordance with this invention it has been found that desirable modification of plants is achieved by applying the above-described plant regulants to seeds, emerging seedlings, roots, stems, leaves, flowers, fruits or other plant parts. Such application may be made directly to the plant part, or indirectly by application to the plant growing medium.

The term "active ingredient" will be used hereinafter in this specification to describe the active o-toluidines of the foregoing formula. In practicing the plant growth regulating methods of this invention, the active ingredients can be used alone or in combination with a material referred to in the art as an adjuvant in liquid or solid form. The plant growth regulating compositions of this invention are prepared by admixing the active ingredient with an adjuvant including diluents, extenders, carriers and conditioning agents to provide compositions in the form of finely-divided particulate solids, granules, pellets, wettable powders, dusts, solutions and aqueous dispersions or emulsions. Thus, the active ingredient can be used with an adjuvant such as a finely divided particulate solid, a solvent liquid of organic origin, water, a wetting agent, dispersing agent, or emulsifying agent or any suitable combination of these.

Illustrative finely divided solid carriers and extenders which are useful in the plant growth regulating compositions of this invention, include, for example, the talcs, clays, pumice, silica, diatomaceous earth, quartz, Fullers earth, sulfur, powdered cork, powdered wood, walnut flour, chalk, tobacco dust, charcoal and the like. Typical liquid diluents include, for example, Stoddard solvent, acetone, alcohols, glycols, ethyl acetate, benzene and the like. The plant growth regulating compositions of this invention, particularly liquids and wettable powders, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents and emulsifying agents are included therein. Such surface-active agents are well known and reference is made to U.S. Pat. No. 2,547,724, columns 3 and 4, for detailed examples of the same.

Generally, the active ingredients are applied in the form of a composition containing one or more adjuvants which aid in the application of a uniform distribution of the active ingredient. The application of liquid and particulate solid compositions of the active ingredient can be carried out by conventional techniques utilizing, for example, spreaders, power dusters, boom and hand sprayers and spray dusters. The compositions can also be applied from air planes as a dust or spray. The application of the plant growth regulating compositions to the plant growth medium is generally carried out by incorporating the compositions in the soil or other media in the area where modification of the plants is desired.

In selecting the appropriate non-toxic rate of application of the active ingredient it will be recognized that precise rates will also be dependent upon the mode of application, such as soil incorporation, band application, preplant seed treatment and various other factors known to those skilled in the art. In foliar treatment for the regulation of plant growth, the active ingredients are applied in amounts from about 0.05 to about 10 or more pounds per acre. Foliar applications of from 0.1 to 5 pounds of the active ingredient per acre are preferred. In applications to the soil habitat of germinant seeds, emerging seedlings, and established vegetation for the regulation of plant growth, the active ingredients are applied in amounts of from about 0.01 to about 20 pounds per acre or more. Preferably, the active ingredients are applied to the soil at a rate of from 0.1 to 10 pounds per acre. Foliar application to plants beginning to blossom are particularly advantageous and are preferred.

In accordance with this invention it has been found that the o-toluidines of the foregoing formula are highly effective plant growth regulants. This particular class of o-toluidines, when applied to dicotyledonous plants, are effective for reducing the stature of the plane with appreciable improvement in the plant's vigor. Thus, one embodiment of the present invention is a method which comprises applying to viable dicotyledonous plants a growth regulating amount of one or more of the o-toluidines of the foregoing formula. The practice of this invention provides means for obtaining plants of reduced stature whereby the growing energy utilized by the plant is channeled more toward fruiting and less toward vegetative growth. Many plants of reduced stature obtained by the present method are more tolerant of drought and cold temperatures and are more resistant to pest infestations and lodging. The method also provides for plants that are in a good state of health and tends to produce more vigorous and prolific plants. The method of the present invention can be conveniently carried out to obtain plants of reduced stature without substantial injury to the plants.

The practice of the method of this invention can be utilized for improving the efficiency of dicotyledonous crop plants such as soybean (Glycine), cotton (Gossypium), beans (Phaseolus), coffee (Coffea) and the like which often do not obtain their yield capacity due to premature blossom drop or because of failure of the fruit to set. The application of the above o-toluidines to such growing crop plants reduces the plant stature and improves the fruit set. In this manner, the plant's efficiency of production is improved and a means is provided for optimizing the crop by increasing the plant population per unit area. Also, such reduction in plant stature increases accessibility to the field for other treatments, cultivation and harvesting.

In the following examples, the chemical was applied as an aqueous composition at the equivalent rate of active ingredient indicated. The aqueous compositions were prepared by solubilizing the required amount of the chemical in a volume of acetone which is further admixed with a like volume of 0.05% by weight aqueous solution of dioctyl sodium sulfosuccinate, surface-active agent, to provide sufficient composition which is applied at the rate equivalent to 200 gallons per acre to apply the chemical at the equivalent rate indicated.

The useful and unexpected plant growth regulating properties of the o-toluidines of the foregoing formula are demonstrated by exemplary tests set forth below as Example 1.

EXAMPLE 1

A number of soybean plants, variety Wayne, are grown from seeds in aluminum pans in a greenhouse for a period of approximately one week to the primary leaf stage. The plants ars thinned to three uniform plants in each pan and the height of each plant in the pan is measured to the terminal bud and the average height is noted. One pan containing three soybean plants is used for each chemical treatment and three pans are not treated and used as a control. The aqueous composition of the chemical is then applied to the pan of growing plants by overhead spray at a rate equivalent to 6 pounds of chemical per acre. The treated pans, along with the control pans, are maintained in a greenhouse and watered from below on a sand bench and fertilized with a uniform portion of a water-soluble balanced fertilizer.

Two weeks after application of the chemical the average height of the soybean plants in the treated pan is again measured as above and the difference in the average height before and two weeks after application represent the increase in the development of the treated plants. This development in growth of the treated plants is compared to the average increase in growth of the plants in the control pans during the same period of time. A variation of 25% or more in the development of at least two-thirds of the treated plants when compared to the development of the control plants demonstrates that the chemical is an effective plant regulant. Thus, a chemical is considered active when the treated plants manifest a decrease in growth of at least 25% less than that of the control plants, i.e., stature reduction or an increase in growth in excess of 25% of that of the control plants, i.e., growth stimulation.

Utilizing the test procedures of Example 1, 4-chloro-o-toluidine, 4-fluoro-o-toluidine, 4-bromo-o-toluidine, 4-bromo-5-chloro-o-toluidine, 4-bromo-5-methyl-o-toluidine, 4-bromo-5-fluoro-o-toluidine, 4-iodo-5-chloro-o-toluidine and 4,5-dichloro-o-toluidine were found to be highly active and showed a stature-reduction in excess of 25% by direct comparison with the control.

The desirable plant growth regulating properties of the o-toluidines of this invention are particularly unexpected since closely related compounds do not perform in the same manner. In tests conducted in accordance with Example 1, 3-chloro-o-toluidine, 3-chloro-p-toluidine, 3-chloro-4-bromo-o-toluidine, 5-fluoro-o-toluidine and 3,4-dimethyl aniline did not demonstrate any significant plant stature reduction and were categorized as inactive. Thus, the criticality of the substituents and their position on the anline ring of the o-toluidines of this invention has been demonstrated.

Further advantages of this invention are shown in Example 2.

EXAMPLE 2

Individual soybean plants, variety Wayne, are grown from seed in 6 inch pots containing a good grade of top soil. Two pots of 4-week old plants (3–4 trifoliate stage) and 2 pots of 6-week old plants (5–6 trifoliate stage) are used for each application of the chemical. An overhead spray of an aqueous composition of the chemical is applied to the pots at an equivalent rate as indicated below. Two to four sets of plants which received no chemical application are included and serve as controls. All of the pots are maintained under good growing conditions and are watered and are uniformly fertilized with a uniform amount of a water-soluble balanced fertilizer. Two weeks after the application of the chemical the growth response of the treated plants are compared with that of the control plants. The total height of the plant is measured to the tip of the terminal bud. A variation of 15% in the average total height of the treated plants, when compared to the average total height of the control plants, demonstrate that the chemical is an effective plant growth regulator. Observations on other plant modifications, e.g., canopy shape, axillary bud development and the like are noted.

Utilizing the test procedure of Example 2, the following results were obtained with the o-toluidines of this invention.

TREATMENT OF 3-4 TRIFOLIATE PLANTS

| Compound | Lbs./acre | Results |
|---|---|---|
| III | 2.5 | Stature reduction, axillary bud development. |
| IV | 5.0 | Axillary bud development, altered canopy. |
| V | 1.0 | Stature reduction, axillary bud development, altered canopy. |
| VI | 2.5 | Do. |
| VII | 1.5 | Do. |
| VIII | 5.0 | Do. |

TREATMENT OF 5-6 TRIFOLIATE PLANTS

| Compound | Lbs./acre | Results |
|---|---|---|
| III | 2.5 | Stature reduction, axillary bud development, altered canopy. |
| IV | 5.0 | Do. |
| V | 1.0 | Do. |
| VI | 2.5 | Do. |
| VII | 1.5 | Do. |
| VIII | 5.0 | Do. |

In utilizing the methods of this invention it is often desirable to treat crops which are planted at excessive populations per unit area. In this manner, crops of reduced stature are obtained which compensates for the overcrowding in the field and the usual reduction in yield of the plants.

A preferred embodiment of this invention comprises the application of 4-bromo-5-chloro-o-toluidine to dicotyledonous crop plants, such as soybeans, which results in plants of reduced stature without the anticipated reduction in yield due to the decrease in the plant size. Thus, in addition to the benefits obtained through stature reduction, there is also obtained an improvement in the yield. This highly beneficial result was demonstrated in field plots. Soybeans, variety Wayne, were planted at two row spacings and two population densities and were treated with a foliar application of 4-bromo-5-chloro-o-toluidine at the rate equivalent to 0.75 pound per acre when the plants were beginning to bloom. This application to the various plant populations reduces the plant's stature approximately 10% when compared to plants in untreated control plots. Each treatment was replicated 4 times and the average yield and average pods per plant as percent of the control plots for each population were ascertained. Further details are set forth as follows:

| Row spacing | Plant/acre | Pods/plant, percent of control | Yield, percent of control |
|---|---|---|---|
| 18 inches | 180,000 | 130.5 | 105 |
| 12 inches | 210,000 | 121 | 107 |

It is to be noted that in the treated field plots the plants manifested a greater stature reduction, i.e., up to 50%, approximately two weeks after treatment with 4-bromo-5-chloro-o-toluidine and then the plants tended to outgrow this stature reduction. Thus a means is provided for treating plants to modify their normal sequential development to agricultural maturity. Although a single application of the chemical to plants beginning to bloom results in stature reduction and increased pod set while maintaining yields, other desirable effects may be obtained by applying more than one application to the plants at separate stages of the plants' development.

The advantages of this invention can be conveniently obtained by the method which comprises applying to viable dicotyledonous plants a stature reducing amount of the active ingredient. This method can be conveniently carried out in conjunction with other agronomic practices such as treating the plants with insecticides, fungicides, herbicides, fertilizer and the like. The application of compositions containing an active ingredient of this invention and other agricultural chemicals such as insecticides, fungicides, fertilizers, nematocides, plant regulants and the like are particularly advantageous in obtaining the desired results with minimum treatment costs.

Methods for the preparation of the o-toluidines useful in accordance with this invention are well known to those skilled in the art. Generally, the amino group of the appropriate 5-substituted-o-toluidine can be protected with an acyl group and the 5-substituted-o-toluidide is halogenated in the 4-position. The 4-halo-5-substituted-o-toluidide is then hydrolyzed to the desired 4-halo-5-substituted-o-toluidine. U.S. Pat. No. 1,930,754 to E. Havas et al. discloses an advantageous method using formic acid to protect the amino group of acylamines.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A method of reducing stature the normal sequential of dicotyledonous plants which comprises treating the plants with an effective nontoxic amount of a compound of the formula

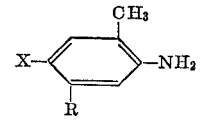

wherein X is halogen and R is selected from the group consisting of hydrogen, methyl and halogen.

2. The method of claim 1 wherein R is halogen.
3. The method of claim 1 wherein X is bromine.
4. The method of claim 1 wherein the compound is 4-bromo-5-chloro-o-toluidine.
5. The method of claim 1 wherein the plants are treated at a rate of from about 0.1 to about 10 pounds per acre.
6. The method of claim 1 wherein the plants are soybeans.
7. The method of claim 6 wherein the compound is 4-bromo-5-fluoro-o-toluidine.
8. The method of claim 6 wherein the compound is 4-bromo-5-chloro-o-toluidine.
9. The method of claim 6 wherein the compound is 4-bromo-o-toluidine.

References Cited

Schwaer et al.: Chem. Abst., vol. 72 (1970), 77742n.
Prasad et al.: Chem. Abst., vol. 72 (1970), 89116z.
Novikova et al.: Chem. Abst., vol. 72 (1970), 30358b.

LEWIS GOTTS, Primary Examiner

C. L. MILLS, Assistant Examiner

U.S. Cl. X.R.

71—121